United States Patent
Lee et al.

(10) Patent No.: US 8,354,825 B2
(45) Date of Patent: Jan. 15, 2013

(54) TWO-STAGE CHARGE EQUALIZATION METHOD AND APPARATUS FOR SERIES-CONNECTED BATTERY STRING

(75) Inventors: Joong Hui Lee, Daejeon (KR); Soo Yeup Jang, Daejeon (KR); Jeon Keun Oh, Daejeon (KR); Gun Woo Moon, Daejeon (KR); Hong Sun Park, Daejeon (KR); Chol Ho Kim, Daejeon (KR)

(73) Assignees: SK Innovation Co., Ltd., Seoul (KR); Korea Advanced Institute of Science and Technology, Daejeon (KR)

( * ) Notice: Subject to any disclaimer, the term of this patent is extended or adjusted under 35 U.S.C. 154(b) by 220 days.

(21) Appl. No.: 12/681,990

(22) PCT Filed: Oct. 16, 2008

(86) PCT No.: PCT/KR2008/006103
§ 371 (c)(1),
(2), (4) Date: Apr. 7, 2010

(87) PCT Pub. No.: WO2009/051413
PCT Pub. Date: Apr. 23, 2009

(65) Prior Publication Data
US 2010/0207579 A1  Aug. 19, 2010

(30) Foreign Application Priority Data
Oct. 16, 2007 (KR) .................. 10-2007-0104033

(51) Int. Cl.
*H02J 7/00* (2006.01)
(52) U.S. Cl. .................. 320/118; 320/116; 320/120

(58) Field of Classification Search .............. 320/116, 320/118, 120
See application file for complete search history.

(56) References Cited

U.S. PATENT DOCUMENTS
5,659,237 A  8/1997  Divan et al.
(Continued)

FOREIGN PATENT DOCUMENTS
EP  0 432 639 B1  5/1995
(Continued)

OTHER PUBLICATIONS
Two-Stage cell balancing scheme for hybrid electric vehicle lithium-ion battery strings, Joong-Hui, Lee et al., Jun. 17, 2007, Power Electronics Specialists Conference, 2007. PESC 2007. IEEE, vol., no., pp. 273-279.*

*Primary Examiner* — Drew A Dunn
*Assistant Examiner* — Steve T Chung
(74) *Attorney, Agent, or Firm* — The Webb Law Firm

(57) ABSTRACT

A two-stage charge equalization apparatus for a series-connected battery string includes a battery module having a plurality of batteries connected in series; a battery string having M (M≧2) battery modules connected in series; M charge control switch modules connected in parallel to each of the M battery modules; M second DC/DC converters connected to each of the M charge control switch modules; a single first DC/DC converter connected to the M second DC/DC converter; and a microprocessor controlling the charge control switch module, wherein the first DC/DC converter is inputted with an overall potential of the battery string and outputs a potential lower than the potential inputted and each of batteries composing the battery module shares the second DC/DC converter using the charge control switch module.

19 Claims, 5 Drawing Sheets

U.S. PATENT DOCUMENTS

| | | | |
|---|---|---|---|
| 5,869,950 A | 2/1999 | Hoffman, Jr. et al. | |
| 6,583,602 B2 * | 6/2003 | Imai et al. | 320/118 |
| 7,193,392 B2 * | 3/2007 | King et al. | 320/118 |
| 8,129,952 B2 * | 3/2012 | Lee | 320/140 |
| 2004/0135545 A1 * | 7/2004 | Fowler et al. | 320/118 |
| 2004/0135546 A1 * | 7/2004 | Chertok et al. | 320/118 |
| 2007/0012274 A1 | 1/2007 | Kawatani | |
| 2007/0127274 A1 | 6/2007 | Bolz et al. | |
| 2007/0139006 A1 | 6/2007 | Yasuhito et al. | |
| 2007/0145946 A1 | 6/2007 | Chiang et al. | |
| 2008/0191663 A1 * | 8/2008 | Fowler et al. | 320/118 |
| 2009/0067200 A1 | 3/2009 | Bolz et al. | |

FOREIGN PATENT DOCUMENTS

| | | |
|---|---|---|
| JP | 10-32936 A | 2/1998 |
| JP | 2004-194410 A | 7/2004 |
| KR | 1999-0037522 A | 5/1999 |
| KR | 10-2000-0057966 A | 9/2000 |
| KR | 100391005 B1 | 5/2001 |
| KR | 2003-0080700 A | 10/2003 |
| KR | 2003-0096978 A | 12/2003 |
| KR | 10-2004-0017629 A | 2/2004 |
| KR | 10-2005-0004544 A | 1/2005 |
| KR | 10-2006-0061315 A | 6/2006 |
| KR | 10-2006-0083343 A | 7/2006 |
| KR | 10-2006-0087837 A | 8/2006 |
| KR | 10-2007-0006762 A | 1/2007 |
| KR | 10-2007-0030224 A | 3/2007 |
| KR | 10-2007-0031406 A | 3/2007 |
| KR | 10-2007-0064244 A | 6/2007 |
| KR | 10-0727002 B1 | 6/2007 |
| WO | 2006100264 A2 | 9/2006 |

* cited by examiner

[Figure 1]
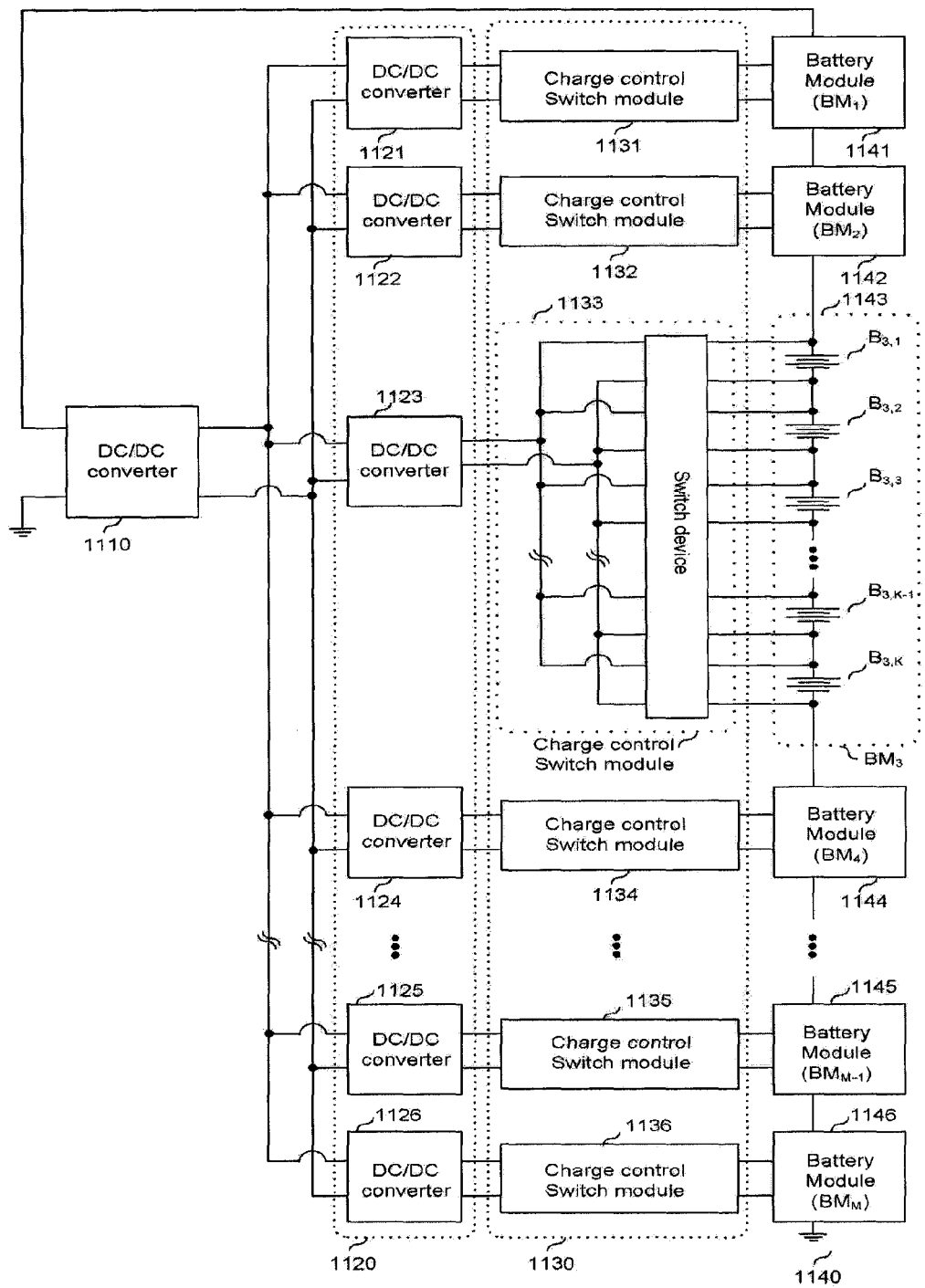

[Figure 2]
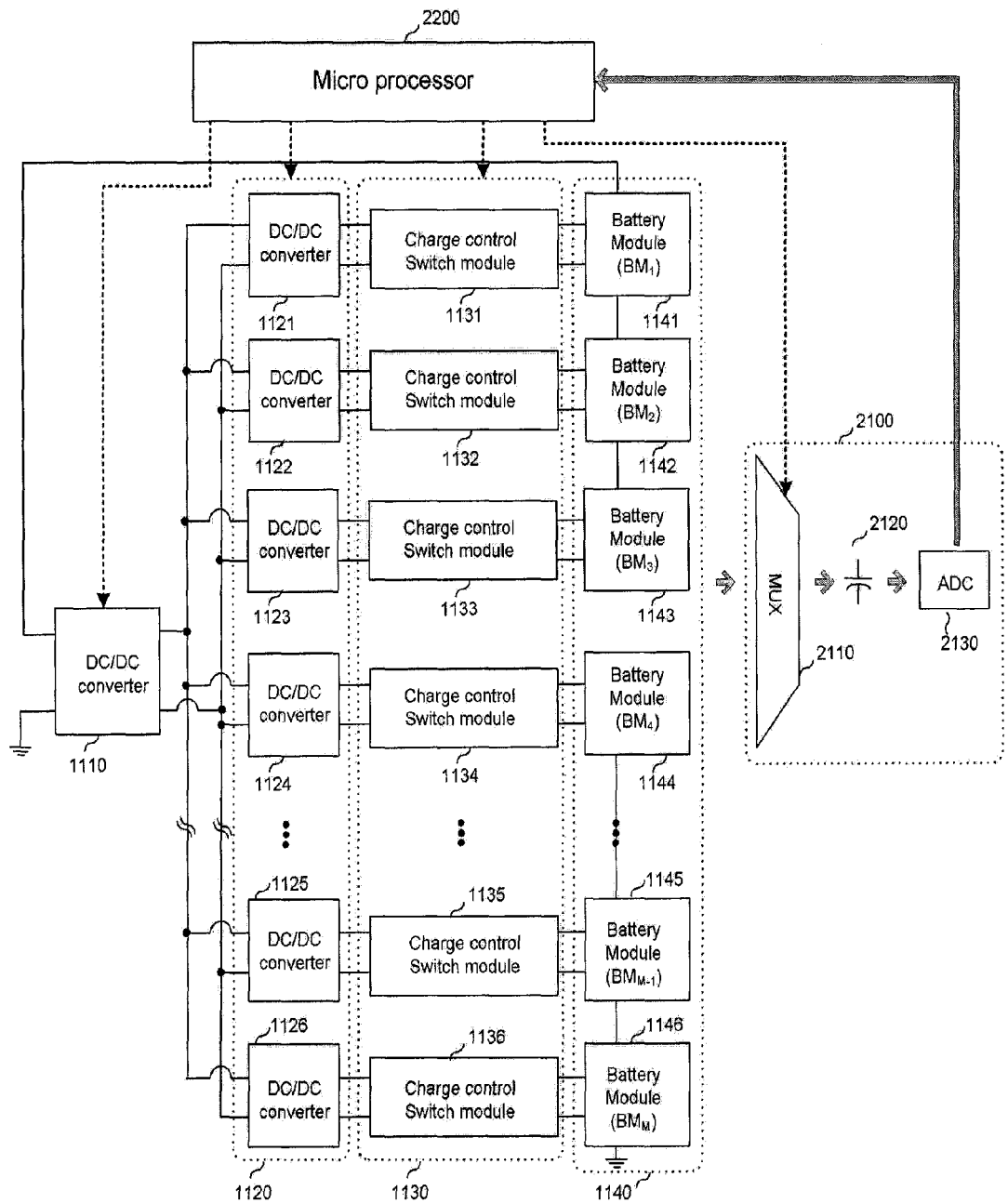

[Figure 3]
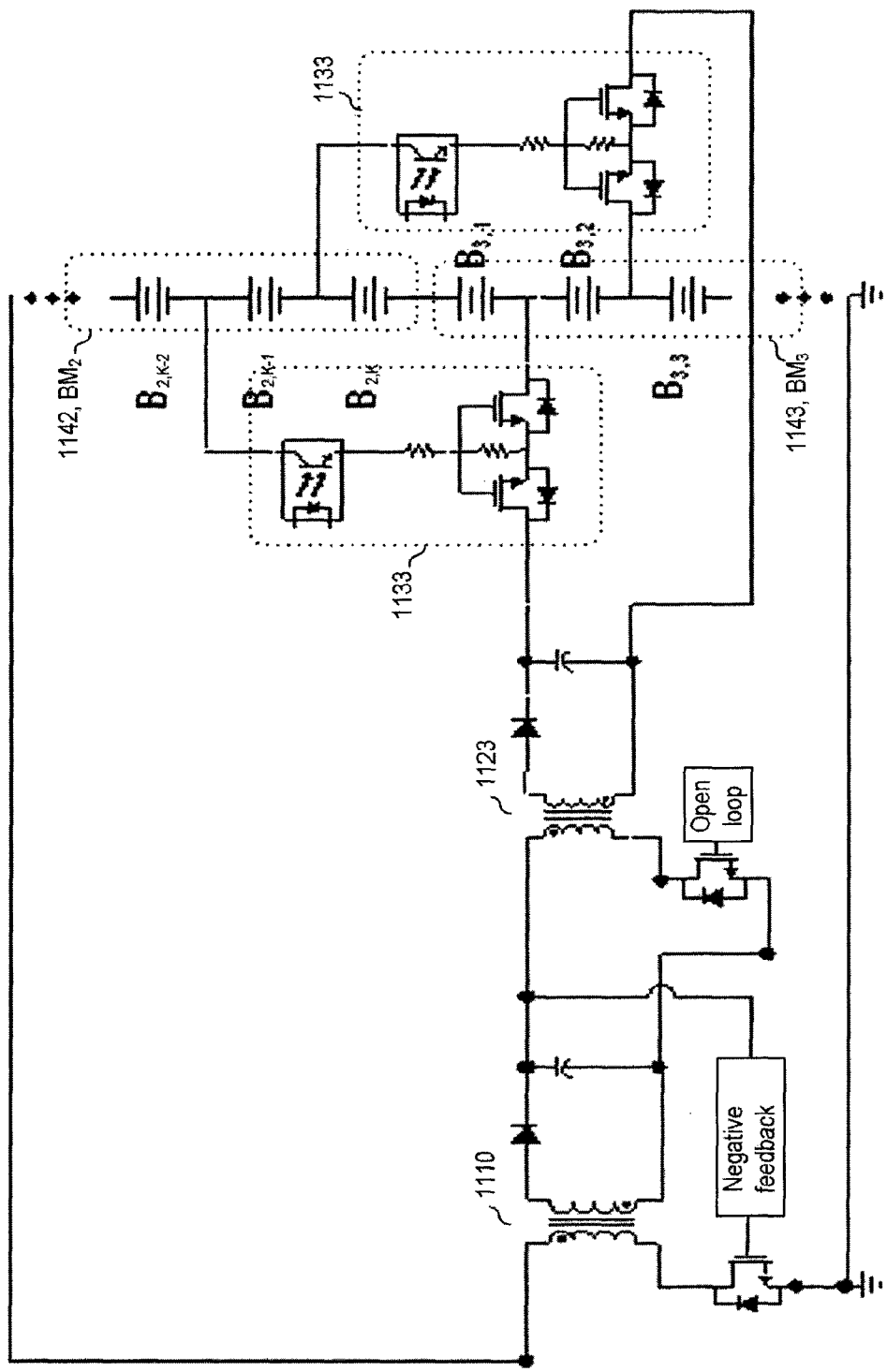

[Figure 4]
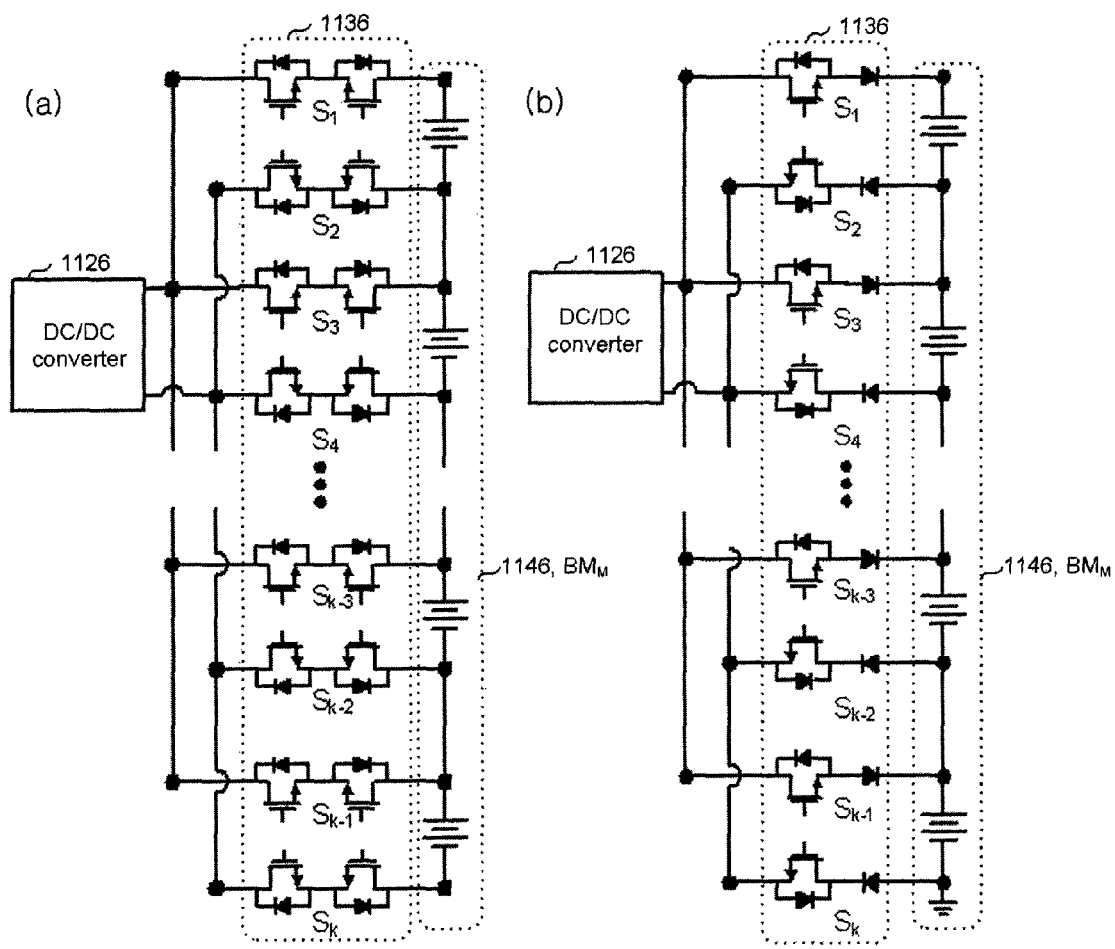

【Figure 5】
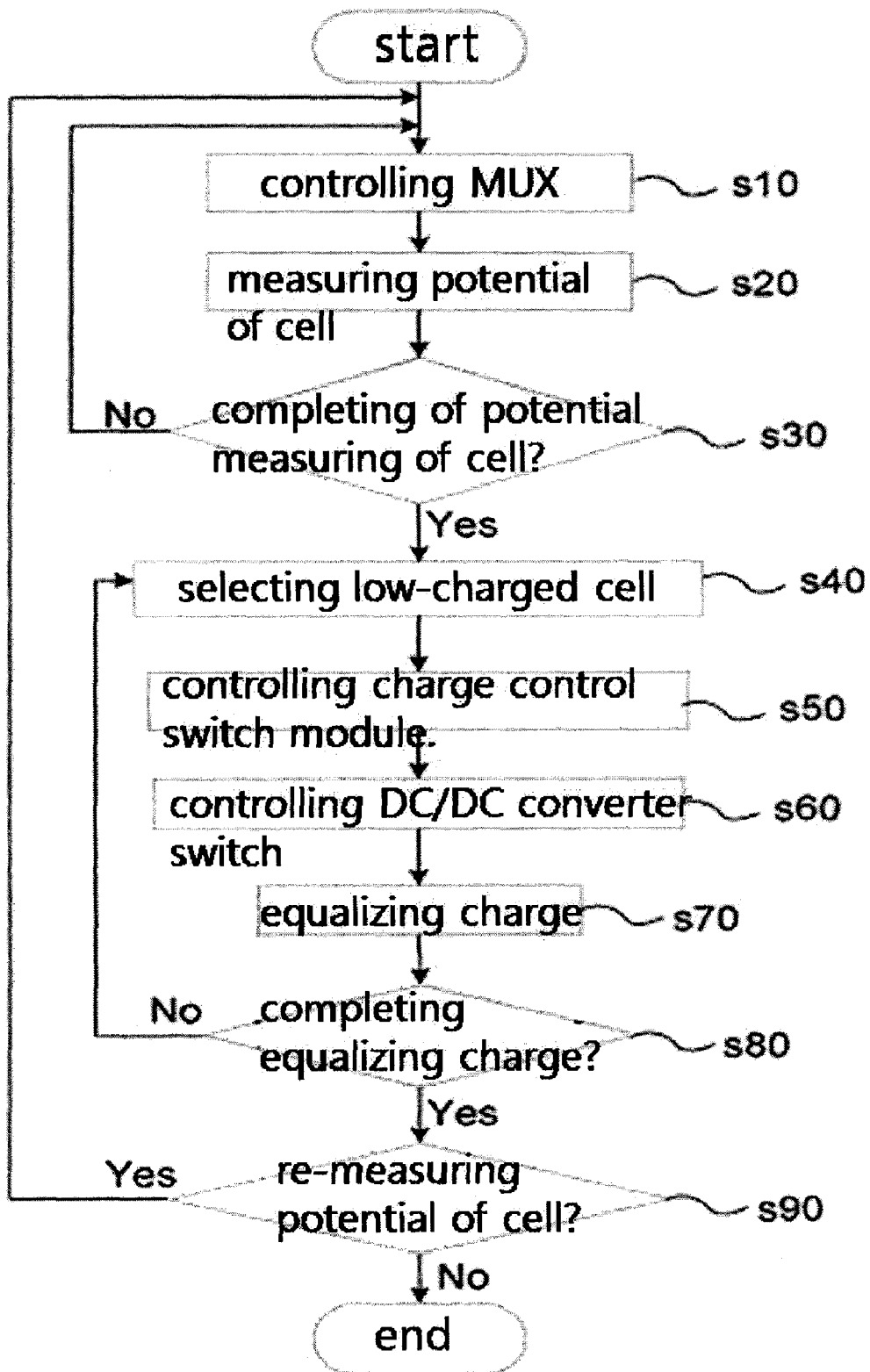

TWO-STAGE CHARGE EQUALIZATION METHOD AND APPARATUS FOR SERIES-CONNECTED BATTERY STRING

TECHNICAL FIELD

The present invention relates to a charge equalization method and apparatus for a series-connected battery string, and more particularly, to a charge equalization method and apparatus which uses a two-stage DC/CD converter.

BACKGROUND ART

In a case that a potential higher than a basic potential of unit battery (cell) is necessary, such as a hybrid vehicle using a lithium ion cell as a power source, it is common to use a plurality of unit batteries which is connected in series.

However, even though the batteries are produced with the same structure via a typical production method using the same anode, cathode and electrolyte material, a difference in charging or discharging (and self discharging) characteristics exists between each of the batteries connected in series.

Therefore, a potential difference can exist between the unit batteries when using the batteries connected in series.

Even if one battery of the unit batteries connected in series is perfectly discharged regardless of a potential of other battery, a total voltage (total voltage of batteries connected in series) becomes zero so that the battery is need to be recharged. Upon recharging the battery, since the potentials of the batteries are different from one another, there is a problem of over-charging in that the battery may reach a prescribed voltage in advance, as well as a problem of charge inefficiency in that some batteries may not reach the prescribed voltage even in an existence of an over-charging.

Further, if the number of charging/discharging times becomes large, degradation is caused in materials composing the battery and thus a property of the battery is varied, and as a result, such degradation situation is responsible for further increasing a difference in individual cells.

In order to address such problems, there are proposed various charge-equalization apparatuses which can accomplish charge equalization of the batteries connected in series.

As an example, Korean patent Laid-Open No. 2003-0096978 is directed to a system consisted of a plurality of unit cells, a charging means, a discharging means, series-parallel converting switch, wherein the charging is performed by uniformly discharging each of the plurality of unit cells and then connecting the discharged unit cells in series using the series-parallel converting switch. Korean Patent Laid-Open 2007-0064244 is directed to a system which comprises a cell unit, a field effect transistor unit connected to the cell unit, an amplifying unit connected to the field effect transistor unit, a multiplexer unit controlling an output signal of the amplifying unit, a comparing unit comparing a difference between voltage signals of the cell unit, an A/D converter converting the output of the comparer to a digital signal, a Micom unit inputting the signal outputted by the A/D converter and outputting signal corresponding to charging/discharging condition, a switching unit operated according to a signal of the Micom unit to provide battery equalization current, and a known charging/discharging circuit.

Further, Japanese Patent Laid-Open No. 1998-032936 is related to a system consisted of a plurality of unit cells, a means for detecting remaining capacity of each unit cell, charge and discharge replacing means for performing charging and discharging of each unit cell, a controller controlling charging and discharging of each unit cell, and direct current/direct current converter performing charging and discharging of each unit cell independently. Japanese Patent Laid-Open No. 2004-194410 is related to a system consisted of at least two unit cell groups, a means for detecting a difference between currents flowing each of a first cell group, and a second cell group, a means for controlling charging/discharging current of the cell group based on the current difference.

However, in the prior charge equalizing apparatuses, since each of batteries connected in series is equipped with a charge equalizing apparatus to perform charging or discharging of individual battery, there are problems in that complexity and volume of the charge equalizing apparatus are increased thereby decreasing productivity and increasing production costs, and elements composing the charge equalizing apparatus or switch module must withstand a higher voltage stress.

The two-stage charge equalization apparatus and method according to the present invention is characterized in that total batteries are classified into battery modules and each of the battery modules shares the DC/DC converter thereby reducing complexity of the charge equalization apparatus and also obtaining efficient charge equalization, the two-stage DC/DC converter is structured such that single DC/DC converter is connected to the input of the DC/DC converter shared for each module thereby reducing the voltage stress of the DC/DC converter and control switch which typically have high voltage stress, and the DC/DC converter shared for each module is connected in parallel to individual battery thereby improving charging efficiency.

DISCLOSURE

Technical Problem

An object of the present invention is to provide a charge equalization apparatus and method for performing efficient charge equalization while reducing complexity of the charge equalizing apparatus performing charge equalization for a series-connected battery string and to provide a charge equalization apparatus and method which can use elements having low withstanding voltage by reducing voltage stress of the elements used for controlling equalization and operation.

Technical Solution

A two-stage charge equalization apparatus for a series-connected battery string comprises a battery module having a plurality of batteries connected in series; a battery string having M (M≧2) battery modules connected in series; M charge control switch modules connected in parallel to each of the M battery modules; M second DC/DC converters connected to each of the M charge control switch modules; a single first DC/DC converter connected to the M second DC/DC converter; and a microprocessor controlling the charge control switch module, wherein the first DC/DC converter is inputted with an overall potential of the battery string and outputs a potential lower than the potential inputted and each of batteries composing the battery module shares the second DC/DC converter using the charge control switch module.

Preferably, inputs of the M second DC/DC converters are connected in parallel to an output of the first DC/DC converter, respectively, and an output of the second DC/DC converter is connected in parallel to each of batteries composing the battery module with the charge control switch module.

Preferably, the first DC/DC converter is a DC/DC converter equipped with a negative feedback circuit. The negative feedback circuit is comprised for constant current control or constant voltage control.

Preferably, the two-stage charge equalization apparatus is equipped with a switch element for controlling on/off operation of each of the first DC/DC converter and the second DC/DC converter, so that the switch element is controlled by a PWM signal generated at the microprocessor.

Preferably, the charge control switch module comprises a bidirectional Metal Oxide Semiconductor Field Effect Transistor (MOFET) switch or a unidirectional MOFET switch along with diode. At this time, the charge control switch module comprises 2K (i.e. K times 2) switch elements with each connected to an anode and a cathode of each battery comprising the battery module, when the number of the series-connected batteries composing the battery module is K.

Preferably, Vgs applied when turning on the MOSFET composing the bidirectional or unidirectional MOSFET switch is a potential of at least two series-connected batteries which is one portion of the battery module. Also, an electronic relay is provided in a gate of the MOSFET composing the bidirectional or unidirectional MOSFET switch.

The electronic relay is a Solid State Relay or an Optocoupler, and preferably comprises a light-emitting diode and a light-receiving element. The light-emitting diode is light-emitted by a control signal of the microprocessor for controlling the charge control switch module. The light-receiving element can be a BJT, and BJT receives the light of the light-emitting diode to be in a low impedance state (turn on) so that a potential of at least two series-connected battery which is one portion of the battery module is applied to a gate of the MOSFET composing the switch element.

The two-stage charge equalization apparatus further comprises a multiplexer having a potential of each battery composing the battery string as inputs and a voltage sensor connected to an output of the multiplexer, and the multiplexer is controlled by the microprocessor and the potential of each battery composing the battery string detected by the voltage sensor is inputted to the microprocessor.

A charge equalization method for a two-stage charge equalization apparatus comprising a battery module having a plurality of batteries connected in series; a battery string having M (M≧2) battery modules connected in series; M charge control switch module connected in parallel to each of the M battery modules; M second DC/DC converter connected to each of the M charge control switch modules; a single first DC/DC converter connected to the M second DC/DC converter; a voltage sensing module including a multiplexer, a voltage sensor and an A/D converter; and a microprocessor controlling the charge control switch module, the multiplexer, the first DC/DC converter and the M second DC/DC converters, comprises steps of (a) measuring a potential of each battery composing the battery string by using the voltage sensing module; (b) selecting low-charged battery based on the detected potential; (c) controlling the charge control switch module to cause the low-charged battery and an output of the second DC/DC converter to be connected in parallel; (d) operating the second DC/DC converter; and (e) operating the first DC/DC converter to charge the low-charged battery. Preferably, the step (a) measures the potential of each battery composing the battery string and the steps (b) to (e) are carried out independently from one another for each battery module.

Preferably, inputs of the M second DC/DC converters are connected in parallel to an output of the first DC/DC converter; and output of the second DC/DC converter is connected in parallel to each battery composing the battery module by the charge control switch module. Also, an input potential of the first DC/DC converter is an overall potential of the battery string and the charging in the step (e) is resulted from total potential of the battery string.

Preferably, an output potential of the first DC/DC converter is lower than the overall potential of the battery string.

Preferably, the batteries are charged by the same second DC/DC converter if the batteries belong to the same battery module.

Advantageous Effects

The two-stage charge equalization apparatus and method is characterized in that total batteries are classified into battery modules and each of the battery modules shares a DC/DC converter thereby reducing complexity of the charge equalization apparatus and also obtaining efficient charge equalization, the two-stage DC/DC converter is structured such that single DC/DC converter is connected to the input of the DC/DC converter shared for each module thereby reducing the voltage stress of the DC/DC converter and control switch which typically have high voltage stress, and the DC/DC converter shared for each module is connected in parallel to individual battery thereby improving charging efficiency.

DESCRIPTION OF DRAWINGS

The above and other objects, features and advantages of the present invention will become apparent from the following description of preferred embodiments given in conjunction with the accompanying drawings, in which:

FIG. 1 is a one configuration diagram of a two-stage charge equalizing apparatus according to the present invention;

FIG. 2 is a other configuration diagram of a two-stage charge equalizing apparatus according to the present invention;

FIG. 3 is a partial view of one circuit diagram of two-stage charge equalizing apparatus according to the present invention;

FIG. 4 is a circuit diagram of a charge-control switch module of two-stage charge equalizing apparatus according to the present invention;

FIG. 5 is a sequential view illustrating a two-stage charge equalizing method according to the present invention;

DETAILED DESCRIPTION OF MAIN ELEMENTS

1140: battery string
1141 to 1146: battery module
1130: switch module
1131 to 1136: charge-control switch module
1120: second stage DC/DC converter
1121 to 1126: DC/DC converter
1110: first stage DC/DC converter
2100: voltage sensing
module 2200: microprocessor
2110: multiplexer
2120: capacitor
2130: analog-digital converter

BEST MODE

Hereinafter, a charge equalizing apparatus and method according to the present invention will be described in detail with reference to accompanying drawings. The accompanying drawings are provided as an example sufficiently to deliver an idea of the present invention to the person skilled in the art.

Therefore, the present invention is not bounded by the drawings presented hereinafter but can be specified in another form. Further, like reference numerals denote like element throughout the following detailed description of the invention.

At this time, if the technological terms and science terms used herein do not have any other definition, they have meanings that can be typically understood by the person skilled in the art. Further, known functions and structures which can unnecessary make obscure the subject matter of the present invention in the following description and accompanying drawings will be omitted.

In addition, a total string of batteries connected in series within the apparatus is referred to as a battery string, and one portion of battery string having the plurality of batteries connected in series is referred to as a battery module, and a given single battery composing a single battery module is referred to as a battery cell.

FIG. 1 is a one configuration diagram of a two-stage charge equalizing apparatus according to the present invention.

Hereinafter, main features of the present invention will be described referring to FIG. 1.

FIG. 1 shows a two-stage charge equalizing apparatus using switch module 1130 and a two-stage DC-DC converters 1100, 1120 according to the present invention. A battery string 1140 is consisted of M battery modules 1141~1146, each battery module has K batteries connected in series. As an example, a third battery module $BM_3$ is consisted of a battery $B_{3,1}$ to a battery $B_{3,K}$. The M battery modules 1141 to 1146 are connected to charge-control switch modules 1131 to 1136 respectively and also the M switch modules 1131 to 1136 are connected to DC/DC converters 1121 to 1126 composing a second stage DC/DC converter 1120 respectively. Therefore, in a case of M battery modules, M switch modules and M DC/DC converters are equipped.

All inputs of the second stage DC/DC converters 1120 are connected in parallel to outputs of the first stage DC/DC converter 110 as shown in FIG. 1. The first stage DC/DC converter 1110 is consisted of a single DC/DC converter having overall potential of the battery string connected to an input, in contrast with the second stage DC/DC converter. At this time, though it is considered that the number of battery cells composing the battery module is the same (K) for every battery modules for the easiness of explanation, the number of battery cells may be different for each battery module.

The switch module 1130 is consisted of charge-control switch modules 1131 to 1136 and the charge-control switch modules 1131 to 1136 provide a current path for allowing the battery cell to share the second stage DC/DC converters. More specifically, considering that the charge equalization for a battery cell $B_{3,3}$ is performed, taking as an example the charge equalization of the battery cells $B_{3,1}$ to $B_{3,K}$ belonging to a third battery module $BM_3$, the corresponding battery cell $B_{3,3}$ is connected to an output of the second stage DC/DC converter 1123 by the charge-control switch module 1133 to provide a charge transfer path, and the charge equalization of the battery cell $B_{3,3}$ is accomplished by total potential of the battery string connected to the first stage DC/DC converter 1110.

At this time, the first stage DC/DC converter 1110 is preferably a DC/DC converter outputting a potential lower than the potential inputted. The switch elements composing the first stage DC/DC converter 1110 and the charge-control switch module 1130 can be structured with a bidirectional switch element of low voltage or a unidirectional switch element of low voltage, by realizing the charge equalization in a concept of battery module, not battery string.

That is, the first stage DC-DC converter 1110 is responsible for generating low output voltage by using total potential of the battery string as the input and the second stage DC-DC converter 1120 is responsible for charging low-charged battery cell actually by using an output of the first stage DC-DC converter 1110 as the input. The selection of low-charged battery cell is performed through charge-control switch.

As shown in FIG. 1, the main features of the present invention is that it adopts the charge control switch modules 1131 to 1136 so that the battery cell can share DC-DC converter in order to reduce the number of the second stage DC-DC converters 1120, the first stage DC/DC is provided to output the potential lower than the potential inputted in order to reduce voltage stress of the switch elements composing the charge-control switch module and the second stage DC-DC converter and obtain efficient charge equalization, and charge equalization is obtained for each battery module by classifying total batteries into M battery modules.

More specifically, the two-stage charge equalization according to the present invention can accomplish charge equalization by controlling charge of the battery cell in order to resolve a potential difference between the batteries caused when charging and discharging the battery in the battery string. At this time, in order to apply the charge to the battery efficiently while controlling the battery cell individually, it is possible to perform charge equalization between batteries, along with reducing overall energy consumption by applying total battery energy to battery cell having relatively lower potential. Further, the control apparatus directly connected to the battery string is simply structured in order to minimize the number of circuits within each battery cell when connecting a plurality of batteries in series, and also common DC-DC converter is used in order to efficiently transfer charging energy to the battery. Further, the batteries of the battery string are divided into a prescribed number of batteries for each module and the common DC-DC converter is used among the battery modules, and current outputted from the common DC-DC converter is entered toward the battery cell via the charge control switch to form a current path using simple switch control manner, and as a result the charge equalization is accomplished.

As explained above, according to the two-stage charge equalization apparatus according to the present invention, it is possible to considerably reduce its complexity, costs and volume and efficiently control an amount of charge entering into the battery cell, by connecting only charge control switch to each battery cell while using one DC-DC converter in common, without a necessity to use separate circuit for each battery cell to control a plurality of batteries, which causes complexity.

FIG. 2 is a preferable configuration diagram of a two-stage charge equalizing apparatus based on FIG. 1. Referring to FIG. 2, the method of controlling the charge equalization apparatus according to the present invention will be described.

Apparatuses 1110 to 1140 have similar apparatus and structure to those of FIG. 1. Though a voltage sensing module 2100 measuring a potential of the individual battery composing the battery string may use a typical voltage sensing module, it is preferably equipped with a multiplexer MUX 2110 having a potential of the individual battery composing the battery string as inputs and a capacitor 2120 connected to an output of the multiplexer. Preferably, the potential of the individual battery measured via the capacitor 2120 is converted into the digital value via an analog-digital converter ADC 1230 and input to a microprocessor 2200.

The first stage DC-DC converter 1110 and the second stage DC-DC converters 1121 to 1126 for each module are equipped with main switches respectively, and the main switches are responsible for on/off of each DC-DC converters 1110, 1121 to 1126 and preferably controlled by a PWM signal generated at the microprocessor 2220 or a control chip dedicated to PWM (not shown). When using the PWM signal generated at the microprocessor, an additional circuit must be preferably provided because current capacity of the PWM signal generated at the microprocessor is limited and therefore the power switch is constrained to be driven.

The microprocessor 2200 measures the potential of the individual battery under a control of the multiplexer 2110, determines low-charged battery based on the potential of the individual battery and controls the switch module 1130, the main switch of each DC-DC converter 1121 to 1126 for each module of the second stage and the main switch of the first stage DC-DC converter 1110, thereby performing charge equalization of low-charged battery cell. At this time, the switch module 1130, the main switch of DC-DC converters 1121 to 1126 for each module of the second stage, and the main switch of DC-DC converter 1110 are controlled in this order to perform the charge equalization.

FIG. 3 shows one circuit diagram of two-stage charge equalization apparatus according to the present invention, focusing on a second battery cell $B_{3,2}$ of the third battery module 1143, $BM_3$.

As explained above, the first stage DC-DC converter 1110 is a DC-DC converter having a negative feedback circuit and the third battery module 1143, $BM_3$ and the second stage DC-DC converter 1123 are connected through the charge controlled switch module 1133. Since the charge control switch module 1133 is equipped with low-voltage bidirectional charge control switch element and is operated in accordance with ON/OFF signal of the microprocessor, an electronic relay must be connected which can transmit ON/OFF signal to the input (gate) of the charge control switch.

The electronic relay is a Solid state relay or an Optocoupler, and it preferably comprises a light-emitting diode and Bipolar Junction Transistor which is a light-receiving element. The BJT receives the light of the light-emitting diode to be in a low impedance state (turn on) so that a potential of at least two series-connected battery which is one portion of the battery module is applied to a gate of the MOSFET composing the switch element.

More specifically, the light-emitting diode is emitted under a control of the microprocessor 2220 to control the charge control switch module 1133 and the BJT is turned on due to an emission of the light-emitting diode so that the turn-on voltage is applied to the gate of the MOSFET composing the charge control switch. At this time, Vgs (Vgs is a gate voltage taking a source voltage of MOSFET as a basis) is a potential of the at least two series-connected batteries which are one portion of the battery module to turn on the MOSFET as shown in FIG. 3. In a case of FIG. 3, the potential of 3 batteries connected in series becomes Vgs upon turning on the MOSFET. The partial voltage of the battery module is used as a power source to drive each of switches composing the charge control switch module 1133.

As described above, the charge-control switch module 1133 can preferably perform ON and OFF switching of higher reliability by using the battery voltage as a power source as shown in FIG. 3.

As shown in FIG. 3, if the low-charged battery cell $B_{3,2}$ is determined, the charge control switch module 1133 corresponding to the battery cell is turned on and the DC-DC converter 1123 of the battery module 1143, BM3 to which the battery cell belongs is turned on. Then, if the main switch of the first stage DC-DC converter 1110 is turned on, current is induced in a primary winding of a first stage transformer due to voltage of total batteries, and as a result, a magnetic energy of same amount is stored in the transformer.

Subsequently, if the main switch of the first stage DC-DC converter is turned off, the magnetic energy stored in the transformer is moved to a second stage DC-DC converter 1123 through a secondary winding and a diode, in which uniform voltage must be remained via the negative feedback circuit since the output voltage of the first stage DC-DC converter is used as an input of the second stage DC-DC converter 1123. The second stage DC-DC converter 1123 passes the primary energy of the transformer stored upon turning on the switch to the secondary energy by means of the switch operation having a fixed duty ratio when the switch is turned off, in which the energy passed to the secondary side is moved to the only battery cell in which the switch of the charge control switch module 1133 is turned on, whereby the charge supply to the desired battery is accomplished.

Since the idea of the present invention can be implemented irrespective of a kind of DC-DC converter used, the two-stage charge equalization apparatus according to the present invention can be configured in combination of various kinds of existing DC-DC converters. For example, the DC-DC converter used in the first stage can be used with the same kind as the second stage DC-DC converter, and also can be used with other kind. The present invention uses two stage DC-DC converter by connecting the charge control switch of low voltage to each battery cell in order to accomplish battery cell voltage control of higher reliability, whereby total voltage of battery string is transferred from the first stage common DC-DC converter at one time and the voltage lower than the voltage at the first stage DC-DC converter is input to the DC-DC converter for each battery module connected to the next stage. Since each element of the DC-DC converter for each battery module has the voltage which is lowered at the first stage as a withstanding voltage by applying low voltage from the first stage DC-DC converter to the input of the DC-DC converter for each battery module, the DC-DC converter for each battery module of the second stage can be designed as a converter of low capacity. Further, by classifying the battery string into M battery modules consisted of K batteries, it is possible to use the charge control switch of low voltage having only voltage of K batteries, instead of the charge control switch having total voltage of the battery string as the withstanding voltage.

FIG. 4 is a circuit diagram of a charge controlling the switch module 1136 connected to Mth battery module 1146, BMM in two-stage charge equalizing apparatus according to the present invention. The controller capable of being used as the charge control switch module 1136 can be used with a bidirectional MOSFET switch (FIG. 4(*a*)) or a unidirectional MOSFET switch along with diode (FIG. 4(*b*)). At this time, the current control direction of the controller is set only at one direction in accordance with operation if using the bidirectional switch or the unidirectional switch along with diode. When the charge control switch module has K batteries connected in series to compose the battery module, the charge control switch module comprises 2K switch elements with each connected to anode and cathode of each battery composing the battery module. FIG. 4 shows the battery module consisted of K/2 batteries, where the charge control switch module comprises K switch elements.

The charge equalization method according to the present invention will be described referring to FIG. 5. A charge equalization method for a two-stage charge equalization apparatus comprising a battery module having a plurality of batteries connected in series; a battery string having M (M≧2) battery modules connected in series; M charge control switch module connected in parallel to each of the M battery modules; M second DC/DC converter connected to each of the M charge control switch modules; a single first DC/DC converter connected to the M second DC/DC converter; a voltage sensing module including a multiplexer, a voltage sensor and an A/D converter; and a microprocessor controlling the charge control switch module, the multiplexer, the first DC/DC converter and the M second DC/DC converters, comprises steps of: (a) measuring a potential of each battery composing the battery string by using the voltage sensing module; (b) selecting low-charged battery based on the detected potential; (c) controlling the charge control switch module to cause the low-charged battery and an output of the second DC/DC converter to be connected in parallel; (d) operating the second DC/DC converter; and (e) operating the first DC/DC converter to charge the low-charged battery.

At this time, in the step (a), the potential of each of all batteries composing the battery string can be measured, the potential of partial batteries composing the battery string can be measured and the potential of at least on battery composing the battery string can be measured.

Also, the steps (b) to (e) can be carried out independently from one another for each battery module.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

The invention claimed is:

1. A two-stage charge equalization apparatus for a series-connected battery string, comprising:
   a battery module having a plurality of batteries connected in series;
   a battery string having M (M≧2) battery modules connected in series;
   M charge control switch modules connected in parallel to each of the M battery modules;
   M second DC/DC converters connected to each of the M charge control switch modules;
   a single first DC/DC converter connected to the M second DC/DC converter; and
   a microprocessor controlling the charge control switch module,
   wherein the single first DC/DC converter is inputted with an overall potential of the battery string and outputs a potential lower than the potential inputted and each of batteries composing the battery module shares the second DC/DC converter using the charge control switch module.

2. The charge equalization apparatus according to claim 1, wherein an input of the M second DC/DC converters is connected in parallel to an output of the single first DC/DC converter.

3. The charge equalization apparatus according to claim 2, wherein an output of the second DC/DC converter is connected in parallel to each of batteries composing the battery module with the charge control switch module.

4. The charge equalization apparatus according to claim 1, wherein the single first DC/DC converter is a DC/DC converter equipped with a negative feedback circuit.

5. The charge equalization apparatus according to claim 1, wherein the two-stage charge equalization apparatus is equipped with a switch element for controlling on/off operation of each of the single first DC/DC converter and the second DC/DC converter.

6. The charge equalization apparatus according to claim 5, wherein the switch element is controlled by a PWM signal generated at the microprocessor.

7. The charge equalization apparatus according to claim 1, wherein the charge control switch module comprises a bidirectional Metal Oxide Semiconductor Field Effect Transistor (MOFET) switch or a unidirectional MOFET switch along with diode.

8. The charge equalization apparatus according to claim 7, wherein the charge control switch module comprises 2K (K times 2) switch elements with each connected to an anode and a cathode of each battery comprising the battery module, when the number of the series-connected batteries composing the battery module is K.

9. The charge equalization apparatus according to claim 7, wherein Vgs applied when turning on the MOSFET composing the bidirectional or unidirectional MOSFET switch is a potential of at least two series-connected batteries which is one portion of the battery module.

10. The charge equalization apparatus according to claim 9, wherein an electronic relay is provided in a gate of the MOSFET composing the bidirectional or unidirectional MOSFET switch.

11. The charge equalization apparatus according to claim 10, wherein the electronic relay comprises a light-emitting diode and a light-receiving element, and the light-emitting diode is light-emitted by a control signal of the microprocessor for controlling the charge control switch module.

12. The charge equalization apparatus according to claim 1, further comprising a multiplexer having a potential of each battery composing the battery string as an input and a voltage sensor connected to an output of the multiplexer.

13. The charge equalization apparatus according to claim 12, wherein the multiplexer is controlled by the microprocessor and the potential of each battery composing the battery string detected by the voltage sensor is inputted to the microprocessor.

14. A charge equalization method for a two-stage charge equalization apparatus comprising a battery module having a plurality of batteries connected in series; a battery string having M (M≧2) battery modules connected in series; M charge control switch module connected in parallel to each of the M battery modules; M second DC/DC converters connected to each of the M charge control switch modules; a single first DC/DC converter connected to the M second DC/DC converter; a voltage sensing module including a multiplexer, a voltage sensor and an A/D converter; and a microprocessor controlling the charge control switch module, the multiplexer, the single first DC/DC converter and the M second DC/DC converters, comprising steps of:
   (a) measuring a potential of each battery composing the battery string by using the voltage sensing module;
   (b) selecting low-charged battery based on the detected potential;
   (c) controlling the charge control switch module to cause the low-charged battery and an output of the second DC/DC converter to be connected in parallel;
   (d) operating the second DC/DC converter; and
   (e) operating the single first DC/DC converter to charge the low-charged battery.

15. The charge equalization method according to claim 14, wherein the step (a) measures the potential of each battery composing the battery string and the steps (b) to (e) are carried out independently from one another for each battery module.

16. The charge equalization method according to claim 14, wherein inputs of the M second DC/DC converters are connected in parallel to an output of the single first DC/DC converter; and output of the second DC/DC converter is connected in parallel to each battery composing the battery module by the charge control switch module.

17. The charge equalization method according to claim 16, wherein an input of the single first DC/DC converter is an overall potential of the battery string and the charging in the step (e) is resulted from total potential of the battery string.

18. The charge equalization method according to claim 17, wherein an output potential of the single first DC/DC converter is lower than the overall potential of the battery string.

19. The charge equalization method according to claim 14, wherein the batteries are charged by the same second DC/DC converter if the batteries belong to the same battery module.

* * * * *